US012682082B2

(12) United States Patent
Andersen et al.

(10) Patent No.: US 12,682,082 B2
(45) Date of Patent: Jul. 14, 2026

(54) ORACLE FOR AUTHENTICATING SOFTWARE LAYERS USING SOFTWARE SECURITY VERSION NUMBERS AND SECURITY CONTEXT

(71) Applicant: Google LLC, Mountain View, CA (US)

(72) Inventors: Jeffrey Thomas Andersen, Kirkland, WA (US); Marius Paul Michiel Schilder, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 306 days.

(21) Appl. No.: 18/485,518

(22) Filed: Oct. 12, 2023

(65) Prior Publication Data

US 2025/0124139 A1 Apr. 17, 2025

(51) Int. Cl.
| | |
|---|---|
| *G06F 21/60* | (2013.01) |
| *G06F 21/57* | (2013.01) |
| *G06F 21/64* | (2013.01) |

(52) U.S. Cl.
CPC ............ *G06F 21/602* (2013.01); *G06F 21/57* (2013.01); *G06F 21/606* (2013.01); *G06F 21/64* (2013.01)

(58) Field of Classification Search
CPC ...... G06F 21/602; G06F 21/57; G06F 21/606; G06F 21/64
See application file for complete search history.

(56) References Cited

U.S. PATENT DOCUMENTS

| | | | | |
|---|---|---|---|---|
| 11,888,970 | B2 * | 1/2024 | Du | H04L 9/3239 |
| 2014/0075197 | A1 * | 3/2014 | Alrabady | G06F 21/57 |
| | | | | 713/176 |
| 2014/0325644 | A1 * | 10/2014 | Oberg | G06F 21/57 |
| | | | | 726/22 |
| 2015/0379270 | A1 * | 12/2015 | Chen | H04L 9/0894 |
| | | | | 713/2 |
| 2018/0157840 | A1 * | 6/2018 | Crowley | G06F 21/57 |
| 2022/0108018 | A1 * | 4/2022 | Osorio Lozano | H04L 9/0866 |
| 2022/0179960 | A1 * | 6/2022 | Spangler | H04L 9/3239 |

OTHER PUBLICATIONS

Apple Platform Security Blog, "Secure Enclave", May 17, 2021, https://support.apple.com/guide/security/secure-enclave-sec59b0b31ff/web, retrieved on Oct. 12, 2023, 10 pages.

* cited by examiner

*Primary Examiner* — Ayoub Alata

(74) *Attorney, Agent, or Firm* — DORITY & MANNING P.A.

(57) ABSTRACT

Example embodiments of the present disclosure provide for an example method including maintaining a current version info list including version info tuples for software layers. The example method includes, upon receipt of a request for a registered version key, performing a comparison algorithm to authenticate a requested version info list including a number of version info tuples associated with software layers. The tuples can include a security version number (SVN) and a security context string for each software layer. The requested version info list can be authenticated using the comparison algorithm to determine that the requested version info list includes version info tuples with higher SVNs than the current version info list. Responsive to authenticating the requested version info list, the method include providing a portion of the requested version info list as input into a key derivation function (KDF) and obtaining a device requested version key as output.

20 Claims, 5 Drawing Sheets

100A

102 — Maintaining A Current Version Info List Comprising A Plurality Of Version Info Tuples For A Plurality Of Software Layers 104 — Upon Receipt Of A Request For A Registered Version Key, Performing A Comparison Algorithm To Authenticate A Requested Version Info List Comprising A Plurality Of Version Info Tuples From A Plurality Of Software Layers, The Version Info Tuples Comprising A Security Version Number (SVN) And A Security Context String For Each Respective Software Layer 106 — Authenticating The Requested Version Info List Based On The Comparison Algorithm, Wherein The Comparison Algorithm Determining That At Least The Requested Version Info List Comprising Version Info Tuples With Higher SVNs Than The Current Version Info List

108

112

100A

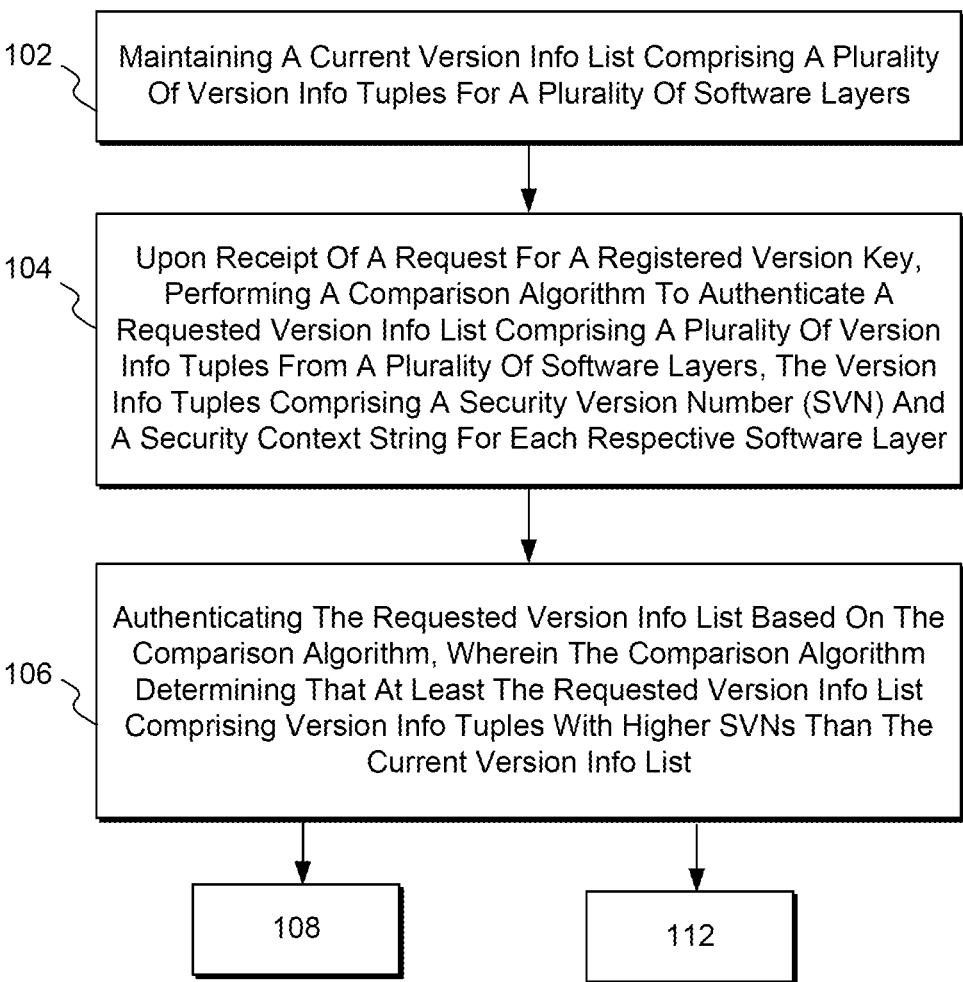

102 — Maintaining A Current Version Info List Comprising A Plurality Of Version Info Tuples For A Plurality Of Software Layers 104 — Upon Receipt Of A Request For A Registered Version Key, Performing A Comparison Algorithm To Authenticate A Requested Version Info List Comprising A Plurality Of Version Info Tuples From A Plurality Of Software Layers, The Version Info Tuples Comprising A Security Version Number (SVN) And A Security Context String For Each Respective Software Layer 106 — Authenticating The Requested Version Info List Based On The Comparison Algorithm, Wherein The Comparison Algorithm Determining That At Least The Requested Version Info List Comprising Version Info Tuples With Higher SVNs Than The Current Version Info List

ORACLE FOR AUTHENTICATING SOFTWARE LAYERS USING SOFTWARE SECURITY VERSION NUMBERS AND SECURITY CONTEXT

FIELD

The present disclosure relates generally to security within a computing system including a versioned key oracle that resides alongside an application processor within a central processing unit. More particularly, the present disclosure relates to systems and methods for authenticating layers of software using software security version numbers (SVNs) and security context. The layers of software and associated SVNs can be bound to symmetric cryptographic keys or signing keys.

BACKGROUND

A boot process for a computing system involves a series of software layers that are loaded and executed sequentially, starting with firmware and culminating in the execution of user-level processes and applications which provide for a functional computing environment. Each component in a boot process plays a role in bringing the computing system to a usable state. Each software layer can have an associated security version number indicative of the current version of the software that has been loaded and/or executed.

SUMMARY

Aspects and advantages of embodiments of the present disclosure will be set forth in part in the following description, or can be learned from the description, or can be learned through practice of the embodiments.

In some aspects, the present disclosure provides for an example computer-implemented method for an oracle for authenticating software layers using software security version numbers and security context. The example method includes maintaining a current version info list including a plurality of version info tuples for a plurality of software layers. The example method includes, upon receipt of a request for a registered version key, performing a comparison algorithm to authenticate a requested version info list including a plurality of version info tuples from a plurality of software layers, the version info tuples including a security version number (SVN) and a security context string for each respective software layer. The example method includes authenticating the requested version info list based on the comparison algorithm, wherein the comparison algorithm determining that at least the requested version info list including version info tuples with higher SVNs than the current version info list. The example method includes, responsive to authenticating the requested version info list, providing at least a portion of the requested version info list as input into a key derivation function (KDF). The example method includes obtaining a device requested version key as output from the KDF.

In some aspects, the present disclosure provides for an example computing system for an oracle for authenticating software layers using software security version numbers and security context including one or more processors and one or more memory devices storing instructions that are executable to cause the one or more processors to perform operations. In some implementations the one or more memory devices can include one or more transitory or non-transitory computer-readable media storing instructions that are executable to cause the one or more processors to perform operations. In the example system, the operations can include maintaining a current version info list including a plurality of version info tuples for a plurality of software layers. In the example system, the operations can include upon receipt of a request for a signature, performing a comparison algorithm to authenticate a requested version info list including a plurality of version info tuples from a plurality of software layers, the version info tuples including a security version number (SVN) and a security context string for each respective software layer. In the example system, the operations can include authenticating the requested version info list based on the comparison algorithm being successful, wherein the comparison algorithm being successful includes at least the requested version info list including version info tuples with higher SVNs than the current version info list. In the example system, the operations can include obtaining a nonce. In the example system, the operations can include responsive to authenticating the requested version info list and obtaining the nonce, providing the requested version info list and nonce as input into a signature component. In the example system, the operations can include obtaining a signature from the signature component based on the requested version info list and the nonce.

In some aspects, the present disclosure provides for an example transitory or non-transitory computer readable medium embodied in a computer-readable storage device and storing instructions that, when executed by a processor, cause the processor to perform operations. In the example transitory or non-transitory computer readable medium, the operations include maintaining a current version info list including a plurality of version info tuples for a plurality of software layers. In the example transitory or non-transitory computer readable medium, the operations include, upon receipt of a request for a registered version key, performing a comparison algorithm to authenticate a requested version info list including a plurality of version info tuples from a plurality of software layers, the version info tuples including a security version number (SVN) and a security context string for each respective software layer. In the example transitory or non-transitory computer readable medium, the operations include authenticating the requested version info list based on the comparison algorithm being successful, wherein the version info list includes an SVN field and context field for each version info list entry, wherein the algorithm is rendered successful if the following is true for each entry in the requested version info list: the corresponding current version info list entry has not yet been populated; a requested version info list entry context field equals a corresponding current version info list entry context field; and a requested version info list SVN field is less than or equal to a corresponding current version info list entry context field. In the example transitory or non-transitory computer readable medium, the operations include responsive to authenticating the requested version info list, providing the requested version info list as input into a key derivation function (KDF). In the example transitory or non-transitory computer readable medium, the operations include obtaining a device requested version key as output from the KDF.

BRIEF DESCRIPTION OF THE DRAWINGS

Detailed discussion of embodiments directed to one of ordinary skill in the art is set forth in the specification, which makes reference to the appended figures, in which:

FIG. 1A depicts an example method for authenticating layers of software according to embodiments of the present disclosure.

DETAILED DESCRIPTION

Figure 1B:
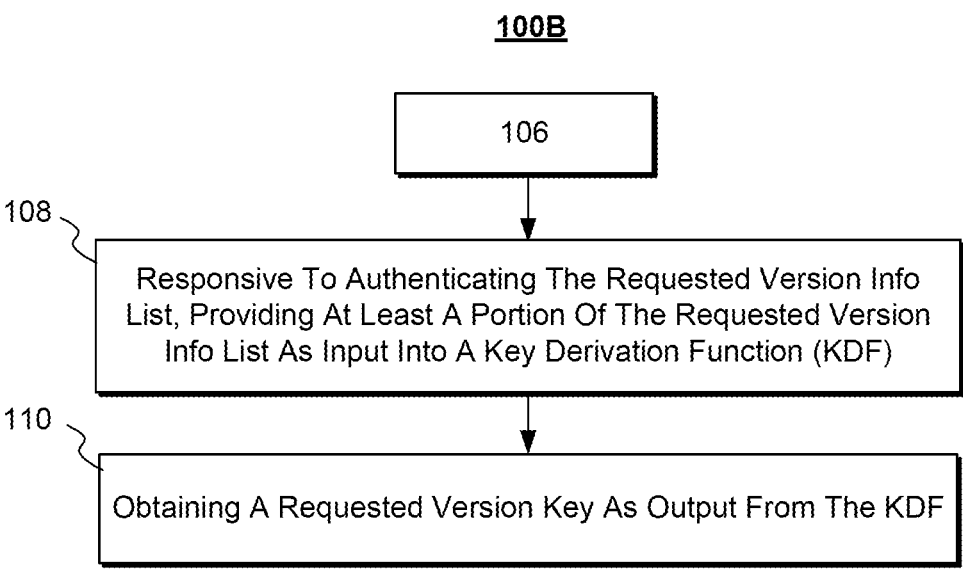
FIG. 1B depicts an example method for obtaining a versioned key responsive to authenticating layers of software according to embodiments of the present disclosure.

The present disclosure provides for authentication of a series of software layers that have been included in a computing system based on security version numbers (SVNs) and security context (e.g., security context string) of the respective software layers (e.g., logical segments of a software system with a define scope and purpose, serving as an organizational and functional unit). The SVN and security context of the respective software layers can be used to determine if the computing system running the series of software layers should have access to secure artifacts (e.g., generate symmetric cryptograph keys bound to software SVNs for access to secrets) or generate signatures over software SVNs. be signed. Existing systems allow for secure artifacts (e.g., secrets) to be bound to individual software layers with associated SVNs, however they fail to allow secure artifacts from a software layer with a lower SVN to be made available to software layer with a higher SVN (e.g., newer version). The present disclosure solves this problem by providing for processes that function as an oracle within a computing system that can generate symmetric cryptographic keys bound to software SVNs or generate signatures over software SVNs, such that software layers with higher SVNs can wield keys bound to or obtain signatures over software layers with lower SVNs, but not vice versa.

The oracle can reside alongside an application processor within a computing system which boots a series of software layers, with each software layer having a distinct SVN. The computing system can maintain a current info list, a root symmetric key, and/or a root signing key. The current info list can include a plurality of tuples of SVN, and context strings associated with each software component. The current info list can be compared to a requested info list that is obtained when the computing system boots at a later time.

Software layers can be updated to a higher SVN with an irregular or regular cadence to remedy bugs or other defects that make the older versions of software layers vulnerable to attacks. Bad actors can uninstall newer software versions and attempt to obtain access to secure artifacts (e.g., secrets) associated with a computing system. Additionally, or alternatively, malicious malware can secretly install itself and run at the highest software privileged level to attempt to attain access to secure artifacts (e.g., secrets) bound to lower SVN software layers. By considering the security context alongside the SVNs, the present disclosure can provide for a trusted boot. The security context can be a data structure used to define and maintain security attributes associated with a particular software layer, layer of software, or specific process. A trusted boot is a security feature that ensures the integrity and authenticity of a computing system's boot process by verifying the digital signatures of boot components to protect against malware and unauthorized software. The present disclosure can be utilized to provide a trusted boot and avoid the aforementioned malicious malware attacks.

Aspects of the present disclosure address these deficiencies by providing a trusted boot including authentication of the series of software layers by generating version info lists associated with the series of software layers.

With reference now to the figures, example embodiments of the present disclosure will be discussed in further detail.

FIG. 1 is a flow diagram of an example method 100A to perform authentication of software layers accordance with some embodiments of the present disclosure. The method 100A can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 100A is performed by the versioned key oracle 205, versioned key oracle 305, or versioned key oracle 450. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processors can be omitted in various embodiments. Thus, not all processes are required in every embodiment. Other process flows are possible.

At operation 102, processing logic maintains a current version info list including a plurality of version info tuples for a plurality of software layers. As described herein, each software layer can have associated version information. The version information for each software layer can be represented as a tuple of (security context, SVN) that describes the given software layer. The version info list can be a data structure including version info tuples for a number of software layers. For instance, the version info list can include an SVN field and a context field for each version info list entry. Each version info list entry can be associated with a different software layer.

In some instances, maintaining the current version info list including the number of version info tuples for a number of software layers can include generating the version info list. For instance, upon boot of a computing system, as each layer of software is booted, a version info tuple including an SVN and a security context string can be appended to the current version info list. The current version info list can function as a ground truth of software version info needed to authenticate the software on the computing system when, at a later time, the computing system (e.g., CPU) attempts to obtain a key bound to the specific set of SVNs (e.g., the current version info list). The version info lists will be described in further detail relating to FIG. 2.

As described herein, an application processor can boot several layers of software, each with a different SVN. A versioned key oracle within the CPU can allow for software running on the application processor to seal secure artifacts (e.g., secrets) such that they are decryptable by newer software but not older software.

For instance, as described in FIG. 1A, as an application processor boots, each software layer can validate the next software layer and determine the software layer's SVN. Before booting the next layer, the SVN can be reported (e.g., as part of a current version info list) alongside the software layer's context string to the versioned key oracle. The versioned key oracle stores the tuples of SVN and context data for each software layer.

At a later time, software on the CPU can attempt to obtain a cryptographic key bound to a given set of SVNs. The processing logic can assemble a requested version info list (e.g., a requested version info data structure, table, etc.) and provide the requested version info list to the versioned key oracle. If the requested version info list represents a sequence of SVNs that are less than or equal to the currently-running software SVNs, the oracle will generate and return the appropriate versioned key.

At operation 104, processing logic, upon receipt of a request for a registered version key, performs a comparison algorithm to authenticate a requested version info list including a plurality of version info tuples from a plurality of software layers, the version info tuples including a security version number (SVN) and a security context string for each respective software. The comparison algorithm can include the compare algorithm described in FIG. 2 (e.g., comparison algorithm 235). The comparison algorithm can include comparing the version info entries of the current version info list to the corresponding version info entries of the requested version info list. If the comparison algorithm is satisfied, the requested version info list can be authenticated.

At operation 106, processing logic authenticates the requested version info list based on the comparison algorithm. The comparison algorithm determining that at least the requested version info list including version info tuples with higher SVNs than the current version info list. As described herein, authenticating the request version info list can fail responsive to the requested version info list being shorter than the current version info list via the comparison algorithm. Failure can result in the processing logic prevent access to secured artifacts for the requested version info lists. In some implementations, the comparison algorithm can be satisfied (e.g., rendered successful). The comparison algorithm being satisfied can occur when certain conditions of the comparison algorithm are met.

By way of example, the requested version info list can be authenticated based on the comparison algorithm being satisfied (e.g., rendered successful). The comparison algorithm can be satisfied if the following is true for each entry in the requested version info list: (i) the corresponding current version info list entry has not yet been populated, (ii) a requested version info list entry context field equals a corresponding current version info list entry context field, and (iii) a requested version info list entry context field is equal to or greater than the corresponding current version info list entry context field. Thus, the comparison algorithm is satisfied if the comparison results in a determination that the security context for each version info list entry aligns with the expected security context and the SVN is greater than or equal to the SVN of the current version info list entry.

The comparison algorithm can allow for software layers of the requested version info list with higher SVNs to wield keys of software layers of the current version info list entries with lower SVNs but not allow for requested version info list entries with lower SVNs to wield keys of software layers of the current version info list entries with higher SVNs. For instance, more updated software layers to have access secure artifacts (e.g., secrets) associated with lower SVN software layers and preventing access to secure artifacts (e.g., secrets) bound to software layers with higher SVNs until the software has been updated.

The authenticated requested version info list can be used for a number of purposes. Two of such purposes are described in FIG. 1B and FIG. 1C. FIG. 1B continues at operation 108 following operation 106 and FIG. 1C continues at operation 112 following operation 106. In some instances, the example methods in FIG. 1B and FIG. 1C can be performed at different times. In some implementations, the example methods in FIG. 1B and FIG. 1C can be performed simultaneously, or nearly simultaneously by the same computing system. The operations associated with FIG. 1B and FIG. 1C will be discussed further herein.

Two example cases where SVNs can be compared include a software upgrade scenario or a software downgrade scenario. The present disclosure can allow for an application processor that is entrusted with secure artifacts (e.g., secrets) to encrypt such that the secure artifacts (e.g., secrets) remain available if the application processor's firmware upgrades to a software with greater SVN but not lesser. For instance, if a processor has booted through three software layers with SVNs (L0 SVN, L1 SVN, L2 SVN). The application processor can obtain a versioned key bound to the series of software layers and SVNs and used the versioned key to encrypt a secret. The application processor.

In a first example, the application processor can upgrade L0 and L2 such that the new software tuple is represented as (L0 SVN+1, L1 SVN, L2 SVN+1). After booting through the updated software, the application processor can decrypt the aforementioned secret by requesting the original versioned key (e.g., the key associated with the tuple represented as (L0 SVN, L1 SVN, L2 SVN)). The comparison algorithm can be performed and authenticate the requested version info list.

For instance, in the present example the current version info list is represented as (L0 SVN, L1 SVN, L2 SVN) and the requested version info list is represented as (L0 SVN+1, L1 SVN, L2 SVN+1). The first step of the comparison algorithm is to determine if the current version info list is shorter than the requested version info list, which it is. As such the compare algorithm moves to the operations where each of the corresponding software layers and SVNs are compared.

By way of example, the system can determine that L0, L1, and L2 are populated by both the requested version info list and current version info list. The system can compare the context field for the requested entry context field and the current entry context field. In the present example, context field is not depicted. However, for illustrative purposes, it will be treated as though the corresponding context fields match. Additionally, the comparison algorithm compares each requested entry SVN field to determine that the requested SVN field is greater than or equal to the current entry, the comparison algorithm is satisfied (e.g., successful).

In the present example, L0 and L2 of the requested version info list have an SVN of SVN+1 which is greater than the L0 and L2 SVNs for the current version info list. Further L1 SVN of requested version info list and current version info list are equal. As such, the comparison algorithm can result in authentication of the requested version info list (e.g., due to satisfaction of the comparison algorithm). Responsive to the comparison algorithm being satisfied, the original key will be returned which facilitates decryption of the secure artifact (e.g., secret).

A second, but related example involves the application processor re-encrypting the secret to a new versioned key, bound to a new version tuple (L0 SVN+1, L1 SVN, L2 SVN+1). If L1 software is downgraded to L1 SVN−1 the requested version info list can be depicted as (L0 SVN+1, L1 SVN−1, L2 SVN+1). The comparison algorithm will not be satisfied for a request for key bound to (L0 SVN, L1 SVN, L2 SVN) or (L0 SVN+1, L1 SVN, L2 SVN+1) because the requested version info list's L1 layer is associated with an SVN−1 value which is less than the current version info list L1 values of L1 SVN. Thus, secure artifacts (e.g., secrets) bound to (L0 SVN, L1 SVN, L2 SVN) or (L0 SVN+1, L1 SVN, L2 SVN+1) will not be decryptable.

FIG. 1B is a flow diagram of an example method 100B to obtain a versioned key responsive to authenticating layers of software in accordance with some embodiments of the present disclosure. The method 100B can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 100B is performed by versioned key oracle 205 or versioned key oracle 450. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processors can be omitted in various embodiments. Thus, not all processes are required in every embodiment. Other process flows are possible.

At operation 108, processing logic, responsive to authenticating the requested version info list, provides at least a portion of the requested version info list as input into a key derivation function (KDF). As described herein, a first security context string of a first software layer can include a truncated hash of a public portion of an asymmetric keypair that signed the software layer. An asymmetric keypair can include two related cryptographic keys: a public key and a private key. The keys an be mathematically linked such that data encrypted by one key can only be decrypted with the other key. The private key can be kept secret and the public key can be shared.

Figure 1C:
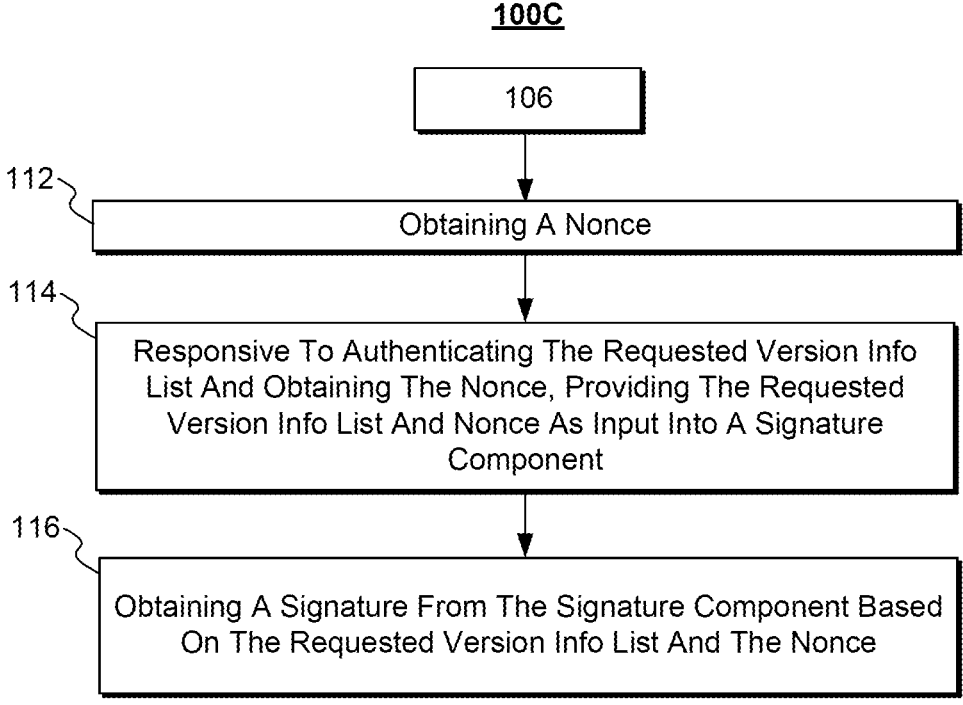
FIG. 1C depicts an example method for obtaining a signature responsive to authenticating layers of software according to embodiments of the present disclosure.

The keypair can bind the software layer to a respective SVN. For instance, the keypair can establish a relationship between the keypair and the series of software layers and associated SVNs. This binding can include an encryption (e.g., as depicted in FIG. 1B) or signature (e.g., as depicted in FIG. 1C). The binding provides a function of limiting access to the secured data unless the holder of the private key can create a valid digital signature or decrypt data encrypted with the corresponding public key. The present disclosure can limit access to the private key unless the series of software layers and associated SVNs can be validated.

In some implementations, the processing logic can maintain a root secret. The key derivation function generates the requested version key based on the root secret. The requested version key that is generated using the key derivation function can be a symmetric cryptographic key bound to a version info list. For instance, the symmetric cryptographic key can be bound to a series (e.g., sequence) of software layers and associated version info list entries.

At operation 110, processing logic obtains a requested version key as output from the key derivation function (KDF). The versioned key can be used to encrypt or decrypt cryptographic data. In some implementations, the versioned key can be transmitted to a trusted platform model (TPM) to obtain secure artifacts (e.g., secrets) from the TPM.

FIG. 1C is a flow diagram of an example method 100C to obtain a signature responsive to authenticating layers of software in accordance with some embodiments of the present disclosure. The method 100C can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 100C is performed by versioned key oracle 305 or versioned key oracle 450. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processors can be omitted in various embodiments. Thus, not all processes are required in every embodiment. Other process flows are possible.

In a computing environment, an application processor can boot several layers of software, each having a different SVN. The software running on the application processor can prove to an external verifier that for each layer of software running within the CPU, the layer matches or exceeds a given value (e.g., has been updated to at least some specified software version number). The external verifier can maintain a policy that results in gating access to resources (e.g., web resources, on device resources, secure artifacts (e.g., secrets)) unless the CPU is able to prove it is running software with sufficiently high SVNs (e.g., updated to a sufficient version).

One example implementation can include a discrete TPM functioning as an external verifier. For instance, the discrete TPM can be computationally separate from the CPU. The TPM can store (e.g., hold) a secure artifact (e.g., secret) that is intended for a CPU so long as the software is running with SVNs such that the requested version info list is authenticated by the comparison algorithm.

As described herein, the secret can have a decryption policy with predicate is that the comparison algorithm is satisfied. In order for the comparison algorithm to be satisfied, the policy reference must be satisfied and can refer to a policy equal to a serialized form of the request software version list tuples (e.g., as depicted above in the L0, L1, L2 example). The authentication object associated with decryption can be the version key oracle's root signing key. A root signing key is a private key associated with a root certificate authority that functions as a trusted entity responsible for issuing digital certificates. The issued digital certificates can be used to verify the authenticity and identity of entities which can include software layers, websites, individuals, or devices on the internet. The root signing key can be used to digitally sign certificates of intermediary certificate authorities which can issue certificates to end entities in a hierarchical fashion. The root signing key is kept offline in a highly secure environment to prevent the root signing key from being compromised.

The authentication object can serve as an entity within the computing system for authentication purposes and can be required to be authenticated before gaining access to specific resources or secure artifacts. For instance, the authentication can include the use of the comparison algorithm to compare the requested version info list to the current version info list to assure that the requisite SVNs are present for the software layers.

The processing logic can additionally ensure the freshness of software being booted by obtaining a nonce. For instance, software running on the CPU can satisfy the policy by obtaining a nonce from the TPM and passing it to the versioned key oracle for signing. The versioned key oracle will only sign the requested SVNs if the CPU booted into software at least as new as those SVNs.

At operation 112, processing logic obtains a nonce. The nonce can be generated by a component external to the oracle or external to the CPU. For instance, the nonce can be generated by the TPM. For instance, processing logic can receive a caller request for signature. Responsive to obtaining the request for signature, the caller can pass a nonce.

At operation 114, processing logic, responsive to authenticating the requested version info list and obtaining the nonce, provides the requested version info list and nonce as input into a signature component. For instance, after the requested version info list is authenticated using the comparison algorithm (e.g., validated), the requested version info list can be serialized and prepared for signing. The nonce can be prepended to the serialized requested version info list. The combined value can be signed by the root signing key, thus generating a signature.

At operation 116, processing logic obtaining a signature from the signature component based on the requested version info list and the nonce. As described herein, a signature can include a value generated by a digital signature algorithm using a private key and some given data (e.g., a version info list). A holder of a corresponding public key can validate the signature over the given data. A nonce can include a value provided by a caller and placed under a signature. The nonce can be used to prove freshness or bind a signature to a given context.

The processing logic can maintain a root signing key. The software layers can be signed based on the root signing key and nonce, as described above. The root signing key can be a private root signing key. The signature can include a value generated by a digital signature algorithm using the private root signing key and the requested version info list.

The obtained signature can be used for different purposes. For instance, the obtained signature can be transmitted to an external component to obtain a secret associated with the external component. The external component (e.g., a TPM) can validate the signature over the version info list using a public root signing key associated with the private root signing key. In some implementations, the obtained signature is transmitted to a trusted platform module to obtain a secret associated with the trusted platform module. In some implementations, the secret associated with the trusted platform module comprises a transport layer security (TLS) credential. A TLS (e.g., or SSL) can include a digital certificate used to secure data transmission over a network through the TLS/SSL protocol. TLS can be used to encrypt or secure data transmitted via the internet, for example, web pages, email communications, or other online services.

Figure 2:
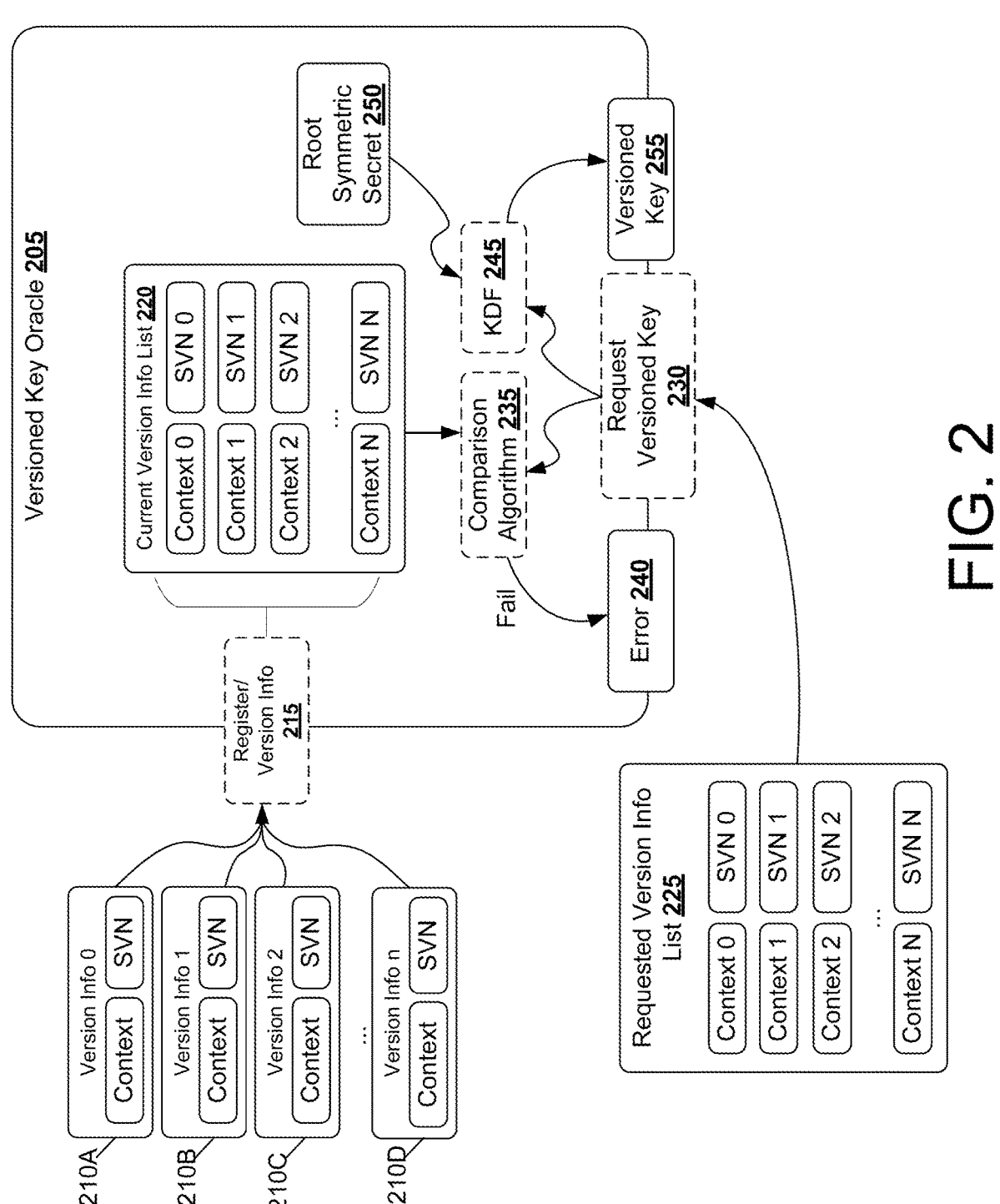
FIG. 2 depicts a block diagram of an example oracle for authenticating software to obtain a versioned key according to embodiments of the present disclosure.

FIG. 2 depicts an example versioned key oracle 205 used for authenticating a series of software layers that have been included (e.g., loaded) in a computing system based on security version numbers (SVNs) and security context (e.g., security context string) of the respective software layers. Software layers can include the operating system, libraries, middleware, applications, and are often developed by different parties but must be capable of integration to allow for proposer application processing. Authentication of software layers can provide for benefits such as ensuring integrity, verification of authenticity, and establishing trust. For instance, ensuring integrity can include verifying that the software layers have not been modified or tampered with during distribution or execution. Modification or tampering of software layers can occur maliciously or accidentally.

The versioned key oracle 205 can reside alongside an application processor within a central processing unit (CPU). The CPU can be configured to boot multiple layers of software, each layer of software having a distinct security version number. The CPU and boot process will be discussed further with regard to FIG. 4.

An SVN can be a positive integer associated with a given software layer. The SVN can denote an overall trustworthiness of the software. SVNs are generally incremented after major bug fixes relating to security or other issues with the prior software SVNs. Security context, also known as security context string, can be a context associated with a given software layer. For instance, the security context can include a truncated hash of a public portion of an asymmetric keypair that signed the software. The keypair can be responsible for binding the software to its respective SVN. FIG. 2 depicts an example of a system wherein, upon authentication of the series of software layers, a root symmetric key can be accessed and utilized alongside the series of software layers, SVNs, and security context to derive derived versioned key 255.

For instance, the versioned key oracle 205 can obtain version info data structures 210A to 210D. The version info data structures can include version information. The version information (e.g., version info) for each software layer can be represented as a tuple of (context, SVN) that describes the given software layer. The register version info operation 215 can cause processing logic to obtain version info data structures 210A to 210D to generate current version info list 220. The current version info list 220 can be a data structure including a number of (security context data, SVN data) tuples. The current version info list 220 can serve as a ground truth of version info list upon the receipt of a request of a versioned key from the versioned key oracle at a later time (e.g., upon rebooting the computing system).

In some implementations, register version info operation 215 can accept a version info data structure (e.g., version info data structures 210A to 210D) and append the version info data structure to a current version info list 220. For instance, during an early booting of an application processer, the register version info operation 215 can be invoked for each layer of software that the application processor boots. By way of example, as each layer of software is loaded and each version info data structure (e.g., version info data structures 210A to 210D) is created, the system can generate a current version info list 220. Current version info list 220 can represent a known state of the layers of software and the software layer's security context and SVN. The current version info list 220 can include a list of version infos of software layers that describe a series (e.g., sequence) of software layers. The current version info list 220 can be utilized, e.g., at a later time, by the computing system to serve as a baseline for comparing future states of the computer system (e.g., future booting). In some implementations, the current version info list 220 can be determined based on a previous boot of the computing system. Additionally, or alternatively, the current version info list 220 can be obtained from a ground truth source (e.g., by an IT Support or Secure party) in an attempt to standardize across computing devices.

By way of example, the processing logic can cause versioned key oracle 205 to obtain a request for versioned key 230. The request for versioned key can include a requested version info list 225. The requested version info list 225 can be a data structure that includes a number of security context-SVN tuples. The requested version info list 225 can be generated by a computing system upon booting the computing system. The requested version info list 225 can be generated to include a list of version infos that describes a sequence (e.g., series) of software layers that have been loaded.

The present system utilizes the software version SVNs as a security check to keep the root symmetric secret 250 secure. For instance, if a bad actor (e.g., attacker) gained access to the root symmetric key, any data encrypted with the root symmetric secret 250 or keys that were derived from it could be decrypted. The present disclosure describes a means for accessing control to the root symmetric secret 250 based on the SVNs associated with a computing system, where software with higher SVNs can access secure artifacts (e.g., secrets) bound to software with lower SVNs without allowing software with lower SVNs to access secure artifacts (e.g., secrets) bound to software with higher SVNs. The root symmetric secret 250 can be utilized for a variety of functions. For instance, root symmetric secret 250 can be used in data encryption, secure communication, or access control. Data encryption can allow for protection of sensitive data at rest (e.g., files stored locally) or in transit (e.g., being transmitted via network communication). Secure communication can be performed by encrypting data exchanged between two parties. Access control can include controlling access to encrypted resources such as files, databases, or devices by using derived keys for user authentication or authorization. Or software authentication as described herein.

An example use case can be seen with regard to the system implementing comparison algorithm 235 responsive to obtaining a request for versioned key 230. Request for versioned key 230 can result in an operation that can include accepting requested version info list 225 and comparing the requested version info list 225 to the current version info list 220 using comparison algorithm 235. In some implementations, the request for a registered version key is obtained responsive to the computing system initiating a booting protocol (e.g., turning on a computing device and loading software layers).

Responsive to obtaining a request for versioned key 230, a comparison algorithm 235 can be performed. For instance, the comparison algorithm 235 can include a number of operations. An operation can include if the requested version info list 225 is shorter than the current version info list 220, the algorithm "fails." If the comparison algorithm 235 is unsuccessful, the operation fails and error 240 occurs. The comparison algorithm "failing" can be associated with the requested version info list 125 not being authenticated. If the comparison algorithm 235 is successful, the processing logic can use the requested version info list 225 as an input into key derivation function 245 which can be keyed by the root symmetric secret 250 to derive the requested derived versioned key 255. The comparison algorithm 235 "succeeding" can be associated with the requested version info list 125 being authenticated.

For each entry in the requested version info list 225, if the corresponding entry in the current version info list 220 has not yet been populated, return successfully. For instance, if the requested version info list 225 includes a software layer with an SVN that is greater than the SVN of the corresponding entry in the current version info list 220, the processing logic can return successfully. If the requested version info list 225 security context does not equal the current version info list 220 security context for the corresponding entry, the comparison algorithm is not satisfied and error 240 occurs. If the requested version info list 225 SVN field is less than the current version info list 220 SVN field for the corresponding entry, the comparison algorithm is not satisfied and error 240 occurs.

As part of comparison algorithm 235, the comparison can be performed for each entry (e.g., version info tuple for each software layer) until a comparison has been performed for each entry and the processing logic has determined that the comparison algorithm is satisfied (e.g., returned successfully) or not been satisfied (e.g., failed). For the comparison algorithm to be satisfied, each entry in the requested version info list 225 must satisfy the comparison algorithm as described herein.

If the compare algorithm is satisfied, a key can be requested using key derivation function 245. The key derivation function can be a function that derives an output key (e.g., derived versioned key 255) based on an input key (e.g., root symmetric secret 250) and other provided data (e.g., requested version info list 215). For instance, the root symmetric secret 250 can be a symmetric key known to versioned key oracle 205. A symmetric key can be a key that is used for both encryption and decryption of data. Thus, any system or person with possession of the symmetric key can encrypt and decrypt messages.

A key derivation function 245 can be performed using the root symmetric secret 250 and the requested version info list 215. A key derivation can be used to generate additional symmetric keys using the root symmetric secret 250. The root symmetric secret 250 can serve as a key at the top of a hierarchy of keys. The root symmetric secret 250 can serve as a point of control for managing encryption and decryption operations in a system or network. For instance, the root symmetric secret 250 can include a central cryptographic key utilized for secure encryption and decryption between the network. The root symmetric secret 250 can be used by the system to derive or generate additional symmetric keys used by the system. The key derivation function 245 can be a cryptographic algorithm designed to derive or generate symmetric keys. The keys derived using key derivation function 245 can be used to secure communications, encrypt files, protect sensitive data, protect secure artifacts (e.g., secrets), or other security related functions.

The derived versioned key 255 can be a symmetric cryptographic key bound to a given version info list. Such that matching version info lists (e.g., if current version info list 220 matches requested version info list 215) a derived versioned key 255 can match if generated with either version info list.

The key derivation function can utilize root symmetric secret 250 and requested version info list 225 to derive a versioned key 255 associated with the version info list. For instance, the derived versioned key 255 can be unique to the combination of context strings and SVN tuples in the requested version info list 225. The derived versioned key 255 can be used to access one or more secure artifacts (e.g., secrets) associated with the computing system which is performing the operations as a versioned key oracle 205.

Figure 3:
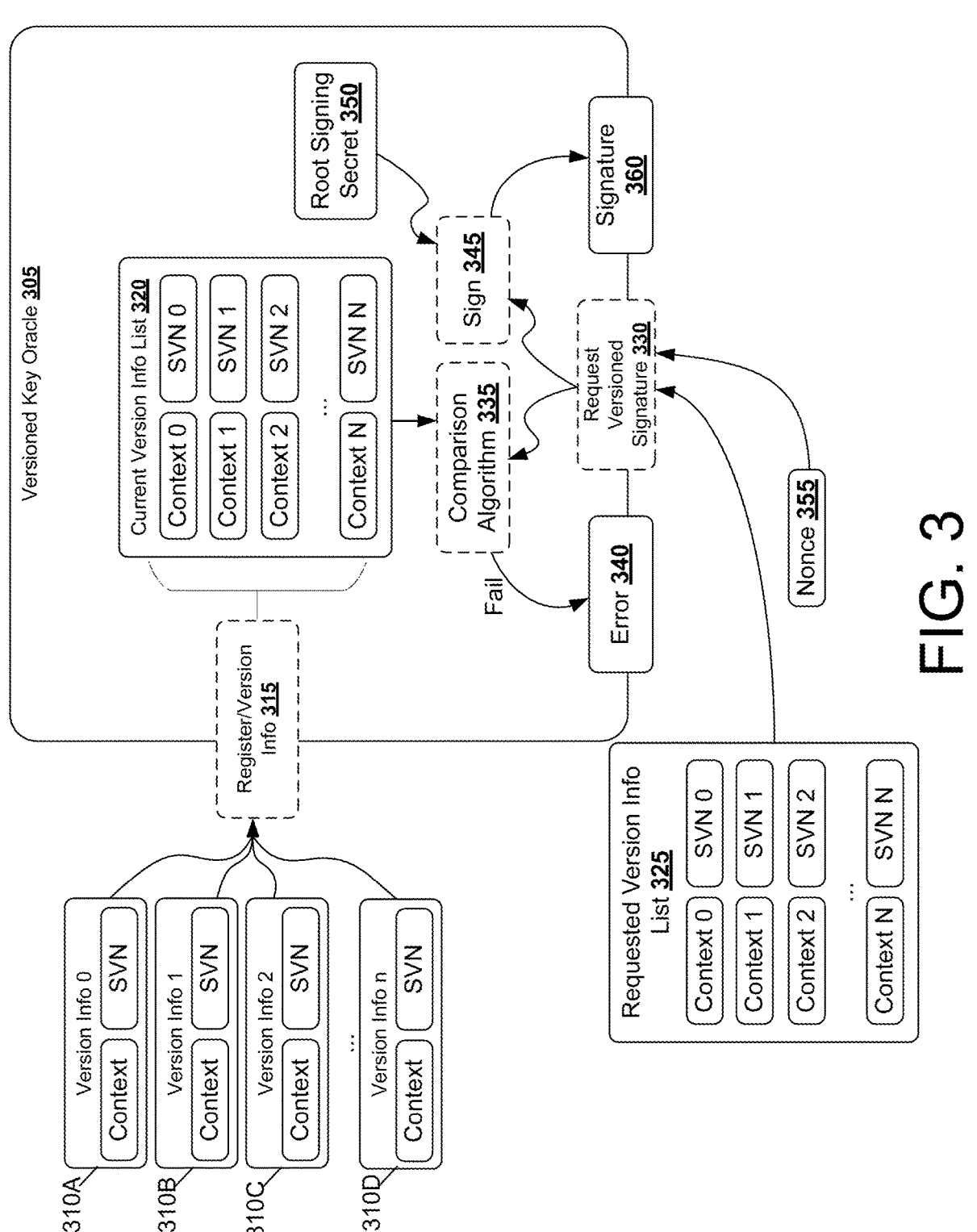
FIG. 3 depicts a block diagram of an example oracle for authenticating software to obtain a signature according to embodiments of the present disclosure.

FIG. 3 depicts an example versioned key oracle 305 used for authenticating a series of software layers that have been included (e.g., loaded) in a computing system based on security version numbers (SVNs) and security context (e.g., security context string) of the respective software layers.

Portions of FIG. 3 are similar to FIG. 2. However, FIG. 3 is focused on an implementation where a signature is obtained and FIG. 2 relates to an implementation where a versioned key is obtained using a root symmetric secret and key derivation function.

For instance, versioned key oracle 305 can be similar to versioned key oracle 205. Register version info 315 can obtained version info data structures 310A to 310B to generate current version info list 320 in the same manner that register version info 315 can obtain version info data structures 210A to 210B to generate version info list 220. Additionally, versioned key oracle 305 can obtain a requested version info list 325. However, versioned key oracle 305 receives a request versioned signature 330 which results in distinct operations from request versioned key 230. Comparison algorithm 335 compares the requested version info list 325 to the current version info list 320 in the same manner that comparison algorithm 235 compares the requested version info list 225 to the current version info list 320. The comparison can result in failure and error 340 or can result in success (e.g., authentication).

Following authentication based on comparison algorithm 335 succeeding, additional operations associated with request versioned signature 330 can be performed.

For instance, the versioned key oracle 305 can obtain a request for versioned signature 330. The request for versioned signature 330 can include requested version info list 325. The requested version info list 325 can be a data structure that include a number of security context-SVN tuples.

Responsive to obtaining a request for versioned signature 330, a comparison algorithm 335 can be performed (e.g., as described with regard to comparison algorithm 235 in FIG. 2).

If the compare algorithm is satisfied, a nonce 355 can be requested or obtained as part of the request for versioned signature 330. Request for versioned signature 330 can provide the requested version info list 325 and nonce 355 to sign function 345 to obtain signature 360. For instance, sign function 345 can utilize a root signing secret 350 responsive to obtaining the requested version info list 325 and the nonce 355 to generate signature 360 associated with the requested version info list 325.

Nonce 355 can indicate the freshness of the request. For instance, a computing system associated with the root signing secret 350 can generate a nonce 355 such as a one-time passcode, randomly generated code, or some other randomized data structure. The nonce 355 can convey that the software layers were loaded recently and that the request for the versioned signature is not dated.

Signature 360 can be utilized to access secure artifacts (e.g., secrets) that are stored in a discrete portion of a computing system or a discrete computing device. For instance, the discrete portion of a computing device can be a trusted platform module (TPM). In some instances, the signature 360 can be unique to the combination of context strings and SVN tuples in the requested version info list 325. The signature 360 can be used to with a discrete portion of the computing system (e.g., or a discrete hardware external to access one or more secure artifacts (e.g., secrets) associated the computing system) which is in communication with the computing system performing the operations as a versioned key oracle 305.

In some implementations, the discrete computing device can include a trusted platform module (TPM). For instance, a TPM can provide credentials or a secret to a computing device responsive to authenticating the context data and SVNs associated with the software layers. Additionally, or alternatively, an implementation can include a computing device proving to a program or external device that the proper software versions have been loaded on the device before allowing access to the program or external device. For instance, responsive to a request for a connection to connect to a company VPN, the system can authenticate the security context and SVNs associated with the computing device attempting to connect to the company VPN.

In some instances, the signatured 360 can be used to demonstrate the identity of a computer system (e.g., a central processing unit (CPU)) to a Trusted Platform Module (TPM). In particular, according to an aspect of the present disclosure, a computer system can generate a symmetric key using a root secret or a signing key using a root signing key. The signing key can be used, for example, to sign a challenge to prove the identity of the computer system (e.g., CPU) to the TPM. Specifically, the signing key can be generated by the computer system by performing a sign function 345.

Another example aspect of the present disclosure is directed to approaches for securely delivering secure artifacts (e.g., secrets) from the TPM to the CPU. In particular, the primitives described herein can be used to ensure that a secret sealed to the TPM state can only be unsealed by and visible to a CPU with a specific policy alias key. This ensures that the secret can only be unsealed in a session initiated by the trusted CPU that has booted software matching the expected measurements. The unseal operation can be done in a salted decrypt session to ensure that the unsealed secret is delivered to the caller encrypted with the current session key. This ensures that any interposer cannot read the plaintext secret from the bus.

The proposed techniques have a number of benefits, including ensuring that: an active interposer cannot modify/drop measurements into the TPM; an interposer cannot intercept plaintext secure artifacts (e.g., secrets) unsealed by the TPM; an interposer cannot satisfy TPM policies which require control of the CPU identity value; attestations can be made regarding the combined root of trust state of the CPU and TPM with a single policy; and it can be made evident to a verifier that a CPU only carried out or requested operations with a specific TPM.

Figure 4:
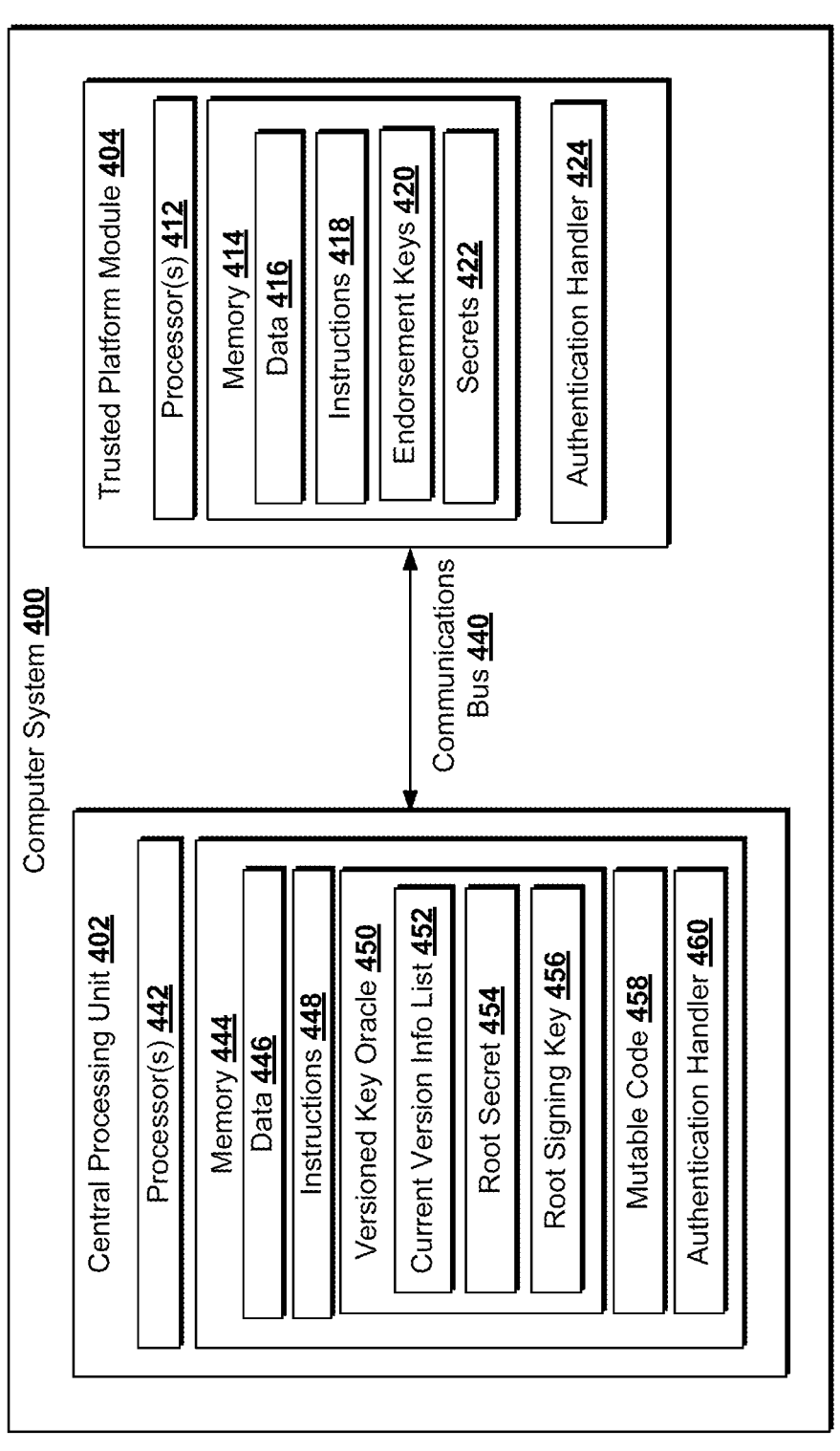
FIG. 4 depicts an example block diagram for authenticating software layers using software security version numbers and security context according to embodiments of the present disclosure.

FIG. 4 depicts a block diagram of an example computing system 400 according to example embodiments of the present disclosure. The computing system 400 can include a central processing unit (CPU) 402 and a Trusted Platform Module (TPM) 404. The CPU 402 and the TPM 404 can communicate with each other over a communications bus 440.

In some implementations, the computing system 400 contains or is embodied as a single computing device, such as, for example, a personal computer, a laptop, an embedded device, a gaming console, a smartphone, a wearable device, a server computing device, etc. Thus, the CPU 402 and the TPM 404 can be included in the same physical device. In other implementations, the computing system 400 can include multiple computing devices communicating and operating in collaboration. Thus, in some instances, the CPU 402 and the TPM 404 can be contained in separate physical devices.

The communications bus 440 can include one or more wired or wireless connections. For example, in some implementations, the communications bus 440 can be a physical communications bus such as physical wiring or conductive traces on a circuit board. In some implementations, the CPU

402 and the TPM 404 can be communicatively connected via a single physical communications bus.

The CPU 402 can include one or more processors 442 and a memory 444. The one or more processors 442 can include any suitable processing device (e.g., a processor core, a microprocessor, an ASIC, an FPGA, a controller, a micro-controller, etc.) and can be one processor or a plurality of processors that are operatively connected. The memory 444 can include one or more non-transitory computer-readable storage media, such as RAM, ROM, EEPROM, EPROM, flash memory devices, magnetic disks, etc., and combinations thereof. The memory 444 can store data 446 and instructions 448 which are executed by the processor 442 to cause the CPU 402 to perform operations.

The memory 444 can also store a current version info list 452, a root secret 454, or a root signing key. The current version info list 452 can include a data structure containing a number of version info pairs. The version info pairs can include at least security context and an SVN. The root secret 454 can include a unique device secret (UDS). The UDS can be a statistically unique, device-specific, secret value. The UDS can be generated externally and installed during manu-facture or generated internally during device provisioning. The UDS can be stored in a non-volatile portion of memory 444, e.g., eFuses, or other suitably protected area to which access can be restricted.

The root signing key 456 can include a unique device secret (UDS). The UDS can be a statistically unique, device-specific, secret value. The UDS can be generated externally and installed during manufacture or generated internally during device provisioning. The UDS can be stored in a non-volatile portion of memory 444, e.g., eFuses, or other suitably protected area to which access can be restricted.

The memory 414 can also store a set of first mutable code 458. The first mutable code 458 can also be referred to as "Layer 0" and can be the first computer language code (e.g., encoded as firmware) that is executed by the one or more processors upon boot of the CPU 402. As one example, the first mutable code 458 can include the Basic Input/Output System (BIOS) (also known as the System BIOS, ROM BIOS, BIOS ROM or PC BIOS), which is firmware used to provide runtime services for operating systems and pro-grams and to perform hardware initialization during the booting process (power-on startup).

The CPU 402 can also include an authentication handler 460. The authentication handler 460 can include computer logic (e.g., embodied in computer-readable instructions) for performing authentication operations described herein. For example, the authentication handler 460 can perform the operations shown and described with reference to the CPU in FIG. 2 or FIG. 3. The authentication handler 460 can be embodied in hardware, firmware, or software.

The TPM 404 can include one or more processors 412 and a memory 414. The one or more processors 412 can include any suitable processing device (e.g., a processor core, a microprocessor, an ASIC, an FPGA, a controller, a micro-controller, etc.) and can be one processor or a plurality of processors that are operatively connected. The memory 414 can include one or more non-transitory computer-readable storage media, such as RAM, ROM, EEPROM, EPROM, flash memory devices, magnetic disks, etc., and combina-tions thereof. The memory 414 can store data 416 and instructions 418 which are executed by the processor 412 to cause the TPM 404 to perform operations.

The memory 414 of the TPM 404 can store a set of endorsement keys 420. For example, the endorsement keys 420 can include a public endorsement key and a private endorsement key. The TPM 404 can hold the private endorsement key secret. Thus, in some implementations, the endorsement keys 420 can be an asymmetric key pair.

The memory 414 of the TPM 404 can also store one or more secrets 422 (or, more generally, objects or secure artifacts). Example secrets include passwords, certificates, or encryption keys. For example, TPM 404 can store the secret(s) 422 in one or more TPM shielded locations. Each TPM shielded location can be a location within the TPM 404 that contains data that is shielded from access by any entity other than the TPM 404 and which may only be operated on by a protected capability.

The TPM 404 can also include an authentication handler 424. The authentication handler 424 can include computer logic (e.g., embodied in computer-readable instructions) for performing authentication operations described herein. For example, the authentication handler 424 can perform the operations shown or described with reference to the TPM in FIG. 3. The authentication handler 424 can be embodied in hardware, firmware, or software. In some instances, authen-tication handler 460 can act as the versioned key oracle for authenticating the mutable code 458 (e.g., layers of soft-ware) associated with the computer system 400.

The technology discussed herein makes reference to serv-ers, databases, software applications, and other computer-based systems, as well as actions taken and information sent to and from such systems. The inherent flexibility of com-puter-based systems allows for a great variety of possible configurations, combinations, and divisions of tasks and functionality between and among components. For instance, processes discussed herein can be implemented using a single device or component or multiple devices or compo-nents working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations or addi-tions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

The depicted or described steps are merely illustrative and can be omitted, combined, or performed in an order other than that depicted or described; the numbering of depicted steps is merely for ease of reference and does not imply any particular ordering is necessary or preferred.

The functions or steps described herein can be embodied in computer-usable data or computer-executable instruc-tions, executed by one or more computers or other devices to perform one or more functions described herein. Gener-ally, such data or instructions include routines, programs, objects, components, data structures, or the like that perform particular tasks or implement particular data types when executed by one or more processors in a computer or other data-processing device. The computer-executable instruc-tions can be stored on a computer-readable medium such as a hard disk, optical disk, removable storage media, solid-state memory, read-only memory (ROM), random-access memory (RAM), or the like. As will be appreciated, the functionality of such instructions can be combined or distributed as desired. In addition, the functionality can be embodied in whole or in part in firmware or hardware equivalents, such as integrated circuits, application-specific integrated circuits (ASICs), field-programmable gate arrays (FPGAs), or the like. Particular data structures can be used to implement one or more aspects of the disclosure more effectively, and such data structures are contemplated to be within the scope of computer-executable instructions or computer-usable data described herein.

Although not required, one of ordinary skill in the art will appreciate that various aspects described herein can be embodied as a method, system, apparatus, or one or more computer-readable media storing computer-executable instructions. Accordingly, aspects can take the form of an entirely hardware embodiment, an entirely software embodiment, an entirely firmware embodiment, or an embodiment combining software, hardware, or firmware aspects in any combination.

As described herein, the various methods and acts can be operative across one or more computing devices or networks. The functionality can be distributed in any manner or can be located in a single computing device (e.g., server, client computer, user device, or the like).

Aspects of the disclosure have been described in terms of illustrative embodiments thereof. Numerous other embodiments, modifications, or variations within the scope and spirit of the appended claims can occur to persons of ordinary skill in the art from a review of this disclosure. For example, one or ordinary skill in the art can appreciate that the steps depicted or described can be performed in other than the recited order or that one or more illustrated steps can be optional or combined. Any and all features in the following claims can be combined or rearranged in any way possible.

Aspects of the disclosure have been described in terms of illustrative embodiments thereof. Numerous other embodiments, modifications, or variations within the scope and spirit of the appended claims can occur to persons of ordinary skill in the art from a review of this disclosure. Any and all features in the following claims can be combined or rearranged in any way possible. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. Lists joined by a particular conjunction such as "or," for example, can refer to "at least one of" or "any combination of" example elements listed therein, with "or" being understood as "and/or" unless otherwise indicated. Also, terms such as "based on" should be understood as "based at least in part on."

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, or equivalents to such embodiments. Accordingly, the subject disclosure does not preclude inclusion of such modifications, variations, or additions to the present subject matter as would be readily apparent to one of ordinary skill in the art. For instance, features illustrated or described as part of one embodiment can be used with another embodiment to yield a still further embodiment. Thus, it is intended that the present disclosure covers such alterations, variations, or equivalents.

What is claimed is:

1. A computing system comprising:
one or more processors; and
one or more computer-readable media storing instructions that are executable to serve as an oracle by causing the one or more processors to perform operations, the operations comprising:
   maintaining a current version info list comprising a plurality of version info tuples for a plurality of software layers;
   upon receipt of a request for a registered version key, performing a comparison algorithm to authenticate a requested version info list comprising the plurality of version info tuples from the plurality of software layers, the plurality of version info tuples comprising a security version number (SVN) and a security context string for each respective software layer;
   authenticating the requested version info list based on the comparison algorithm, wherein the comparison algorithm determining that at least the requested version info list comprising a subset of the plurality of version info tuples with higher SVNs than the current version info list;
   responsive to authenticating the requested version info list, providing at least a portion of the requested version info list as input into a key derivation function (KDF); and
   obtaining a device requested version key as output from the KDF.

2. The computing system of claim 1, wherein authenticating the request version info list fails responsive to the requested version info list being shorter than the current version info list.

3. The computing system of claim 1, the operations comprising:
   maintaining a root secret, wherein the key derivation function generates the requested version key based on the root secret.

4. The computing system of claim 1, wherein the requested version key is a symmetric cryptographic key bound to a version info list.

5. The computing system of claim 1, wherein the versioned key is transmitted to a trusted platform model to obtain a secure artifact from the trusted platform model.

6. The computing system of claim 5, wherein the secure artifact comprises a secret.

7. The computing system of claim 1, wherein a first security context string of a first software layer comprises a truncated hash of a public portion of an asymmetric keypair that signed the first software layer, wherein the keypair binds the first software layer to a respective SVN.

8. The computing system of claim 1, wherein the version info list comprises an SVN field and context field for each version info list entry, wherein the algorithm is rendered successful if the following is true for each entry in the requested version info list:
   a corresponding current version info list entry has not yet been populated;
   a requested version info list entry context field equals a corresponding current version info list entry context field; and a requested version info list SVN field is less than or equal to a corresponding current version info list entry context field.

9. The computing system of claim 1, wherein the maintaining of the current version info list comprising a plurality of version info tuples for a plurality of software layers comprises:

for each software layer booted by the computing system:

appending a version info tuple comprising a security version number and a security context string.

10. The computing system of claim 1, wherein the request for a registered version key is obtained responsive to the computing system initiating a booting protocol.

11. A computing system comprising:

one or more processors; and one or more computer-readable media storing instructions that are executable to serve as an oracle by causing the one or more processors to perform operations, the operations comprising:

maintaining a current version info list comprising a plurality of version info tuples for a plurality of software layers;

upon receipt of a request for a signature, performing a comparison algorithm to authenticate a requested version info list comprising the plurality of version info tuples from the plurality of software layers, the plurality of version info tuples comprising a security version number (SVN) and a security context string for each respective software layer;

authenticating the requested version info list based on the comparison algorithm being successful, wherein the comparison algorithm being successful comprises at least the requested version info list comprising a subset of the plurality of version info tuples with higher SVNs than the current version info list;

obtaining a nonce;

responsive to authenticating the requested version info list and obtaining the nonce, providing the requested version info list and nonce as input into a signature component; and obtaining a signature from the signature component based on the requested version info list and the nonce.

12. The computing system of claim 11, wherein the obtained signature is transmitted to a trusted platform module to obtain a secret associated with the trusted platform module.

13. The computing system of claim 12, wherein the secret associated with the trusted platform module comprises a transport layer security (TLS) credential.

14. The computing system of claim 11, wherein the nonce is generated by a component external to the oracle.

15. The computing system of claim 11, the operations comprising:

maintaining a root signing key, wherein a software is signed based on the root signing key.

16. The computing system of claim 15, wherein the root signing key is a private root signing key, and wherein the signature is a value generated by a digital signature algorithm using the private root signing key and the version info list.

17. The computing system of claim 16, wherein the obtained signature is transmitted to an external component to obtain a secret associated with the external component, and wherein the external component can validate the signature over the version info list using a public root signing key associated with the private root signing key.

18. The computing system of claim 11, wherein the request for a signature is obtained responsive to the computing system initiating a booting protocol.

19. A computer-implemented method comprising:

maintaining a current version info list comprising a plurality of version info tuples for a plurality of software layers;

upon receipt of a request for a registered version key, performing a comparison algorithm to authenticate a requested version info list comprising the plurality of version info tuples from the plurality of software layers, the plurality of version info tuples comprising a security version number (SVN) and a security context string for each respective software layer;

authenticating the requested version info list based on the comparison algorithm being successful, wherein the version info list comprises an SVN field and context field for each version info list entry, wherein the algorithm is rendered successful if the following is true for each entry in the requested version info list:

a corresponding current version info list entry has not yet been populated;

a requested version info list entry context field equals a corresponding current version info list entry context field; and a requested version info list SVN field is less than or equal to a corresponding current version info list entry context field;

responsive to authenticating the requested version info list, providing the requested version info list as input into a key derivation function (KDF); and obtaining a device requested version key as output from the KDF.

20. The computer-implemented method of claim 19, wherein the version info list comprises an SVN field and context field for each version info list entry, wherein the algorithm is rendered successful if the following is true for each entry in the requested version info list:

the corresponding current version info list entry has not yet been populated;

a requested version info list entry context field equals a corresponding current version info list entry context field; and a requested version info list SVN field is less than or equal to a corresponding current version info list entry context field.

* * * * *